US008136718B1

(12) United States Patent
Snyder et al.

(10) Patent No.: US 8,136,718 B1
(45) Date of Patent: Mar. 20, 2012

(54) ASSIST MECHANISM FOR OPERATING AN AFTER HOUR/NIGHT DEPOSITORY DEVICE

(75) Inventors: Michael J. Snyder, Cincinnati, OH (US); Arthur D. Flint, Jr., Cincinnati, OH (US); Daniel P. Grabowski, Indian Springs, OH (US); Joshua G. Bollin, Maineville, OH (US)

(73) Assignee: Security Systems Equipment Corporation, Cincinnati, OH (US)

( * ) Notice: Subject to any disclaimer, the term of this patent is extended or adjusted under 35 U.S.C. 154(b) by 0 days.

(21) Appl. No.: 13/052,574

(22) Filed: Mar. 21, 2011

(51) Int. Cl.
*B65G 11/04* (2006.01)

(52) U.S. Cl. .......................................... 232/44; 109/66

(58) Field of Classification Search .................... 232/19, 232/44, 1 E, 43.4, 43.5; 109/19, 66–68; 220/478, 220/479; 49/68; 16/66, 84
See application file for complete search history.

(56) References Cited

U.S. PATENT DOCUMENTS

| | | | | |
|---|---|---|---|---|
| 2,480,685 | A | 8/1949 | Brown et al. | |
| 2,572,003 | A | 10/1951 | Binns et al. | |
| 2,581,621 | A * | 1/1952 | Behrens et al. | 232/44 |
| 2,617,584 | A * | 11/1952 | Behrens | 232/44 |
| 2,901,165 | A * | 8/1959 | Krug | 232/44 |
| 2,967,015 | A | 1/1961 | Blauvelt | |
| 3,465,955 | A * | 9/1969 | De Boer et al. | 232/44 |
| 3,784,090 | A * | 1/1974 | Markham | 232/44 |
| 4,063,520 | A * | 12/1977 | Parsons | 109/66 |
| 4,176,610 | A * | 12/1979 | Markham et al. | 109/59 R |
| 4,466,357 | A * | 8/1984 | Masachika | 109/66 |
| 4,483,255 | A | 11/1984 | Collier, Jr. et al. | |
| 4,489,662 | A * | 12/1984 | Masachika | 109/66 |
| 4,573,416 | A * | 3/1986 | Masachika | 109/66 |
| 5,284,101 | A * | 2/1994 | Oder et al. | 109/46 |
| 5,802,991 | A | 9/1998 | Brown et al. | |

OTHER PUBLICATIONS

2010 ADA Standards for Accessible Design, Department of Justice, Sep. 15, 2010, 355 pages.
Excepts from: 2010 ADA Standards for Accessible Design, Department of Justice, Sep. 15, 2010, Appendix to 35.151()c), 6 pages.

* cited by examiner

*Primary Examiner* — William L. Miller
(74) *Attorney, Agent, or Firm* — Hasse & Nesbitt LLC; Daniel F. Nesbitt

(57) ABSTRACT

An after hour depository device, having a framework including a first sidewall and a second sidewall, and having a front opening, a hopper assembly including a door having a front face and bottom portion, a handle disposed on an upper end of the front face, and a deposit hopper on the inside of the door, and a horizontal shaft fixed to and extending from at least one side of the bottom portion of the hopper assembly, the horizontal shaft having an end portion extending through the first sidewall, the horizontal shaft and the hopper assembly being pivotable within the framework between a closed position in which the door covers the front opening of the framework, and a full open position in which the front opening is uncovered. A lever arm fixed to the end portion of the horizontal shaft at a rotary angle, the lever arm including a distal arm end extending radially, and a gas spring secured pivotably at a first end to the distal end of the lever arm, and secured pivotably at a second end to the sidewall. The gas spring exerts a torsional force on the distal end of the lever arm to deliver a torque on the horizontal shaft that reduces the required pulling force on the handle to initiate the movement of the hopper assembly from the closed position toward the full open position.

9 Claims, 14 Drawing Sheets

ASSIST MECHANISM FOR OPERATING AN AFTER HOUR/NIGHT DEPOSITORY DEVICE

BACKGROUND

After hour/night depositories provided at bank and other financial institutions are typically constructed such that a chute extends from a depository device disposed in an opening through the outside wall of the building of the bank, to a safe or a money depositing receptacle, The depository device includes a door opening and closing device (referred hereinafter as a hopper assembly) arranged outward of the entrance of the chute, whereby a bag or an envelope including money deposited into the depository device slides down through the chute by gravity when the device is operated. Such depository devices have been used for decades, and are made of steel material to enhance security. Typically the door of the device includes a hopper on the inside of the door which receives the deposit envelop or money bag that is placed through the opening of the depository when the door is pulled opened. Associated with the hopper is a plunger or scoop which is pivotably affixed to the hopper, and which sweeps the envelope or money bag from the hopper when the door is closed, to ensure that the envelope or money bag passed down through the chute and into the safe. Examples of after hour/night bank depository devices are described in U.S. Pat. Nos. 2,617,584, 3,465,955, 3,784,090, 4,063,520, 4,176,610, 4,483,255, 4,489,662, 4,573,416, and 5,284,101, the disclosures of which are incorporated by reference in their entireties.

The outer door of the depository pivots around a horizontal axis in a lower portion of the hopper assembly to permit the door to pivot out away from the depository opening. In many after hour/night depository devices, the person using the depository can open the door to a first stop position that allows only a thin opening into the hopper for placing envelopes. The door is opened from its initial closed position by pulling on a handle attached to the top of the door, down and away from the depository opening, to pivot the door open. To deposit a thicker envelop or a bag of money or instruments, a lock is unlocked, typically with a night depository key, that allows the door to pivot open to a second bag stop in one movement that allows the placement of the larger envelop or bag inside the hopper. The door is closed by lifting on the door handle, to pivot the door upward and back to the closed position. This action also causes the plunger to sweep the hopper of its contents into the chute.

The construction of the hopper assembly device includes the outer door and its pivot hinge, a handle for grasping and opening (and closing) the door, the hopper affixed to the inside surface of the door, and the plunger. The hopper assembly device can also include an integral ballast portion affixed the inside of the door, which is provided to counter-balance the weight of the hopper and plunger as the door pivots from its completely closed position toward the opening stop positions, and from the open positions to the closed position. Despite such feature, conventional night depository devices require a considerable amount of pull force upon the handle to initiate an opening of the hopper assembly from its completely closed position toward the opening stop positions, and to initiate a closing of the hopper assembly from its open or stop position(s) to the completely closed position. Generally, as much as 20 pounds force (lbf) or more upon the door handle is needed to initiate an opening or a closing of the hopper assembly.

In many cases, the weight of the hopper assembly itself is significant, and when the hopper assembly is open and is moving toward the full-open stop or position, the door can free-fall and impact the open stop with significant force, or can require the user to exert an opposite upward force to resist and prevent such free-fall.

Early versions of the Americans with Disabilities ADA Standards for Accessible Design had no specific requirements governing the maximum force necessary to operate an after hour or night depository. The recently introduced ADA Standards for Accessible Design (2010) has added a provision under Section 228 Depositories, Vending Machines, Change Machines, Mail Boxes, and Fuel Dispensers that depositories (including but not limited to night receptacles in banks) shall comply with Section 309 of the Standards. Section 309 Operable Parts includes Subsection 309.4 Operation that states "The force required to activate operable parts shall be 5 pounds (22.2 N) maximum."

Consequently, there remains a need to improve the design and operation of night depository devices to require less force to initiate an opening of the hopper assembly from its completely closed position toward the opening stop positions, to initiate a closing of the hopper assembly from its open or stop position(s) to the completely closed position, and to improve the operation of the door by the user by controlling the amount of force necessary during opening and closing the hopper assembly.

SUMMARY OF THE INVENTION

The present invention provides an improvement in the design and operation of a night depository device to require less force to initiate an opening of the hopper assembly from its completely closed position toward the opening stop positions. The present invention also provides an improvement in the design and operation of a night depository device to require less force to initiate a closing of the hopper assembly from its open or stop position(s) to the completely closed position. The present invention further provides an improvement in the design and operation of a night depository devices to improve the operation of the door by the user by controlling the amount of force necessary during opening and closing of the hopper assembly.

An aspect of the present invention is a mechanical assist device on a night depository that reduces the force required by the user to initiate opening and to initiate closing of the hopper assembly (when empty) to less than 5 pounds.

An aspect of the present invention is a mechanism on a night depository device that lowers the force required by the user to less than 5 pounds throughout the operation of the hopper assembly from fully closed to fully open, and back to fully closed, and to and from positions therebetween.

The present invention provides an after hour depository device, including:—a framework including a first sidewall and a second sidewall, and having a front opening,—a hopper assembly including a door having a front face and bottom portion, a handle disposed on an upper end of the front face, and a deposit hopper on the inside of the door,—a horizontal shaft fixed to and extending from at least one side of the bottom portion of the hopper assembly, the horizontal shaft having an end portion extending through the first sidewall, the horizontal shaft and the hopper assembly being pivotable within the framework between a closed position in which the door covers the front opening of the framework, and a full open position in which the front opening is uncovered,—a lever arm fixed to the end portion of the horizontal shaft at a rotary angle, the lever arm including a distal arm end extending radially, and—a gas spring secured pivotably at a first end to the distal end of the lever arm, and secured pivotably at a second end to the first sidewall at an anchor position, wherein the gas spring exerts a torsional force on the distal end of the lever arm to deliver a torque on the horizontal shaft that reduces the pulling force on the handle required to initiate the movement of the hopper assembly from the closed position toward the full open position.

The present invention further provides that the gas spring is a push-type gas spring, or a pull-type gas spring.

The present invention also provides that the lever arm extends radially in a direction substantially through the handle, and that the lever arm has an arcuate arm sweep defined between the closed position and the full open position of the hopper assembly, and wherein a line, which passes through the stationary pin and the horizontal shaft, divides the arcuate arm sweep, and typically in the middle. The gas spring can be secured pivotably at the second end to a stationary pin fixed to the sidewall.

The present invention further provides that, at the closed position of the hopper assembly, the force rating of the gas spring, the length of the distal end of the lever arm, and the rotary angle of the lever arm deliver a torque on the horizontal shaft that exerts at least 15 lbf of tangential force at the handle.

An aspect of the invention includes a movable plunger in operative association with the hopper assembly for developing a pocket in which a bag or an envelope including money to be deposited is placed.

Another aspect of the present invention is a pair of rotary bearings positioned on both sides of the hopper assembly. The bearings reduce the frictional resistance of the horizontal shaft of the hopper assembly rotating through an opening in the sidewalls of the night depository device.

DETAILED DESCRIPTION OF THE INVENTION

The present invention provides an improvement in the design and operation of a night depository devices to require less force to initiate an opening of the hopper assembly from its completely closed position toward the opening stop positions. The present invention also provides an improvement in the design and operation of a night depository device to require less force to initiate a closing of the hopper assembly from its open or stop position(s) to the completely closed position. The present invention further provides an improvement in the design and operation of a night depository device to improve the operation of the door by the user by controlling the amount of force necessary during opening and closing of the hopper assembly.

The present invention provides a mechanism on the night depository that lowers the force required by the user to open and close the hopper (including when empty), preferably to a pull force at opening, or a lift force at closing, of less than 5 pounds force (lbf). The actual force necessary to close the hopper can also vary dependent on the weight of the object placed in the depository receptacle.

The high force to initiate opening and closing of a conventional night depository device is due in large part to the heavy weight of the hopper assembly 10 having a center of mass (CM) that is displaced outboard and behind the horizontal pivot axis 100 at the start of opening (when the hopper assembly 10 is at its fully closed position), and in front of the axis 100 at the start of closing (when the hopper assembly 10 is at an open position). These forces to initiate opening and closing of the conventional hopper assembly has been determined to be up to 20 lbf or more. To achieve the desired goal, an external torsional force at the initiation of opening of the hopper assembly must be delivered to create an assisting tangential force at the handle in the direction of pull of up to about fifteen pounds force or more. This external torsional force can be accomplished with a mechanical device that exerts torque upon a horizontal shaft fixed to the hopper assembly. Preferably the mechanical device also stores and holds kinetic energy generated by the mass of the hopper assembly itself as it pivots through the opening and closing operation. The mechanical device includes, but is not limited to, a mechanical spring and a pressurized gas spring.

Operation of a Conventional Night Depository Device

Figure 1:
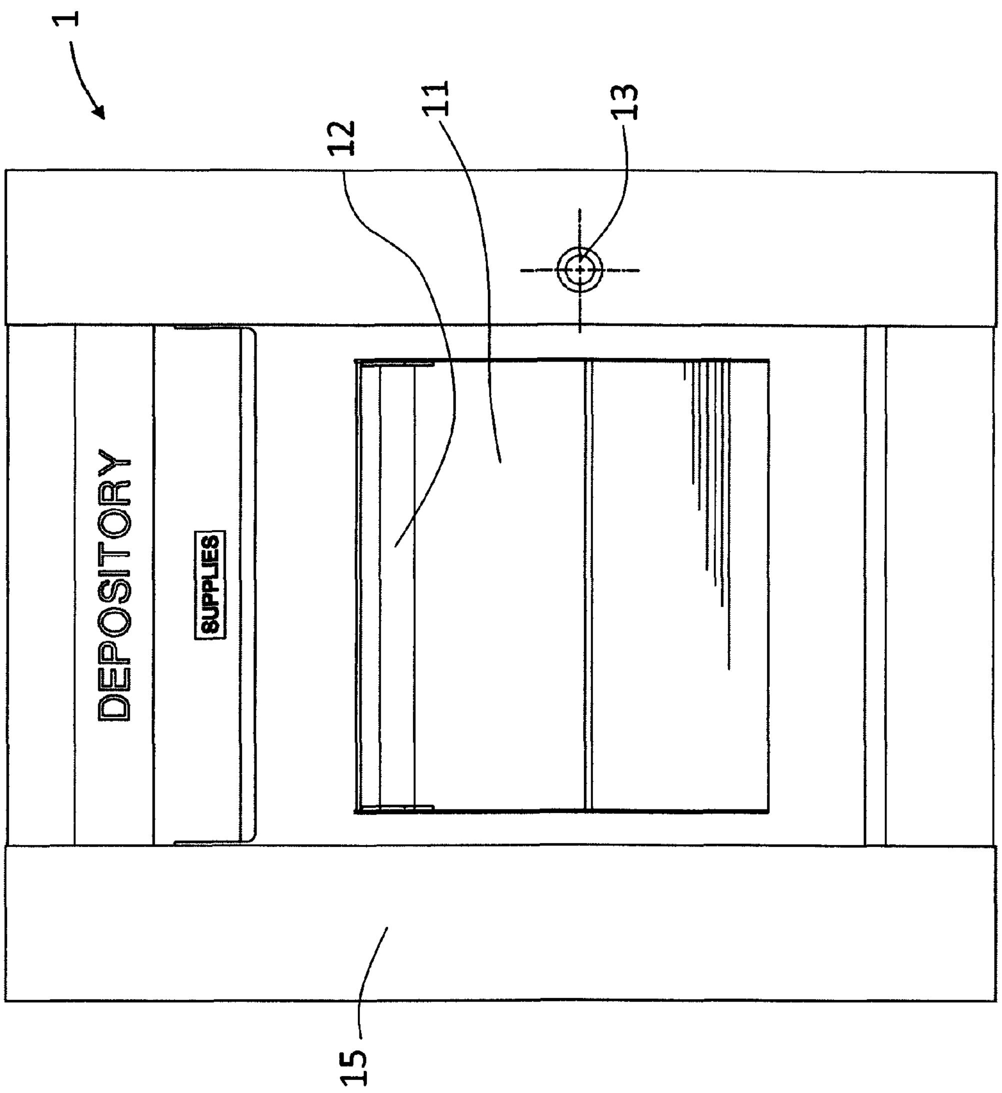
Figure 1 Prior Art
FIG. 1 shows a front elevation view of a conventional after-hour or night depository device.
Figure 2:
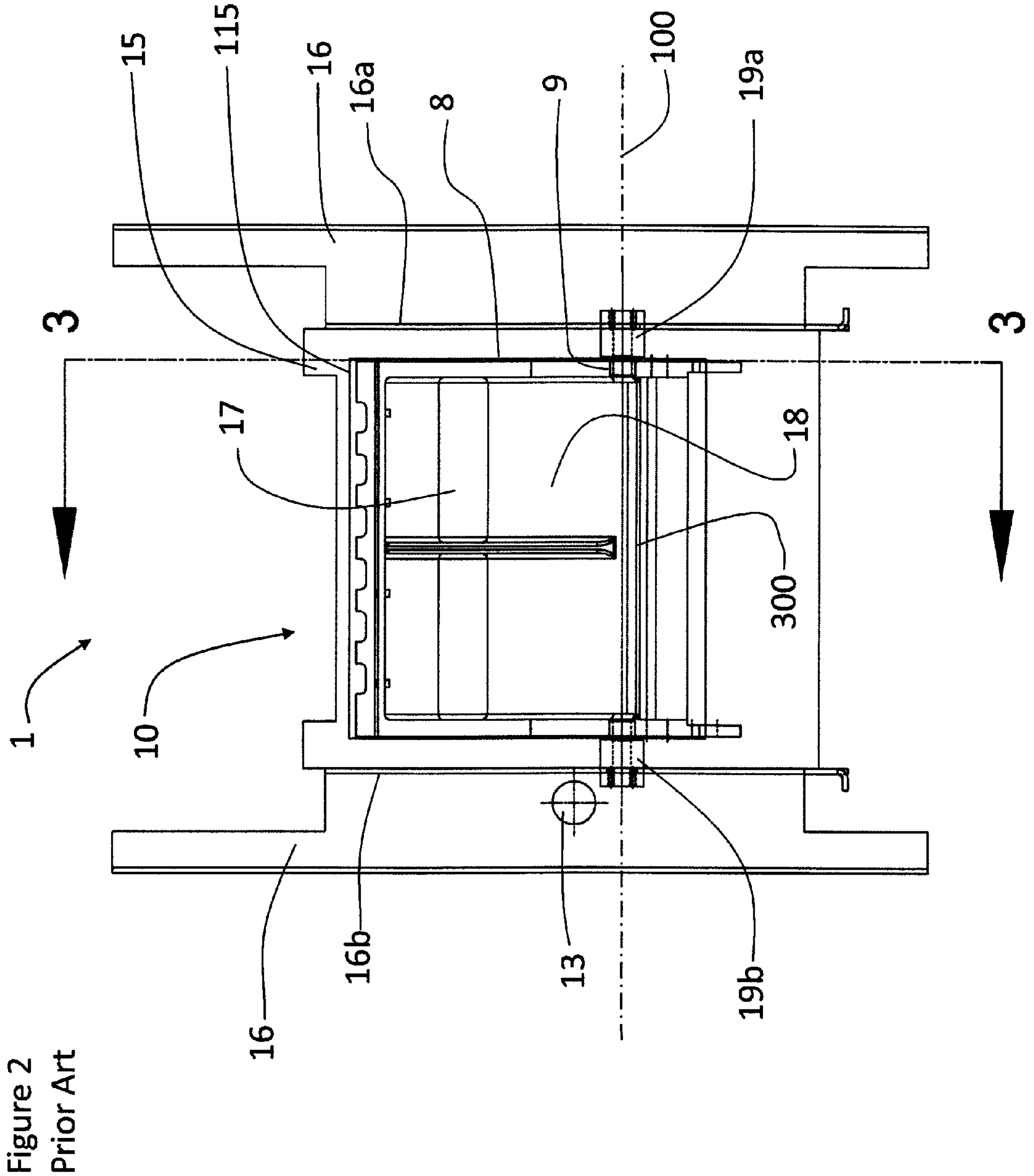
Figure 2 Prior Art
FIG. 2 shows a rear elevation view of the conventional after-hour or night depository device.
Figure 3:
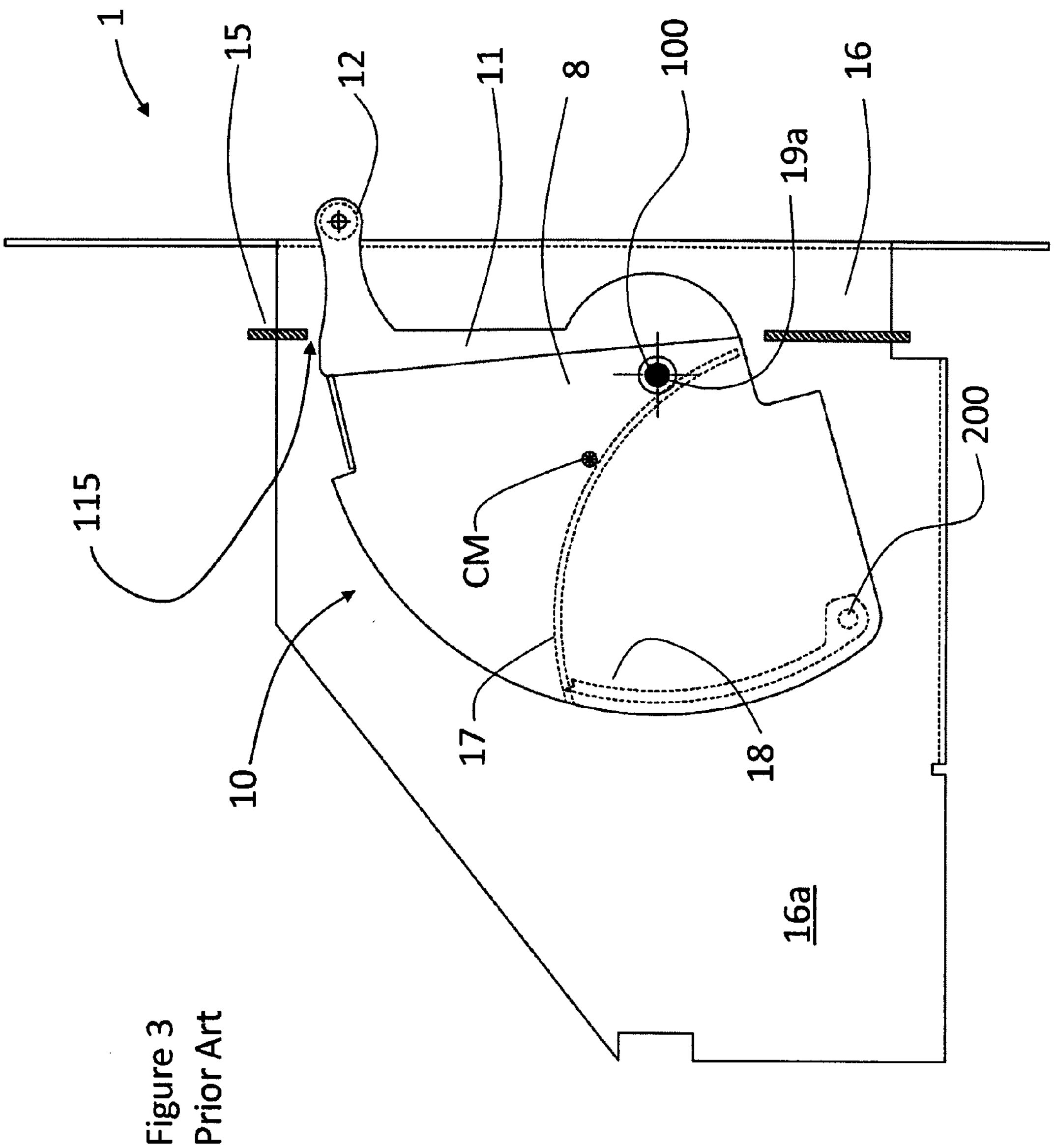
Figure 3 Prior Art
FIG. 3 shows a side elevation sectional view of the conventional after-hour or night depository device, taken through line 3-3 of FIG. 2, with the hopper assembly in a closed position.
Figure 4:
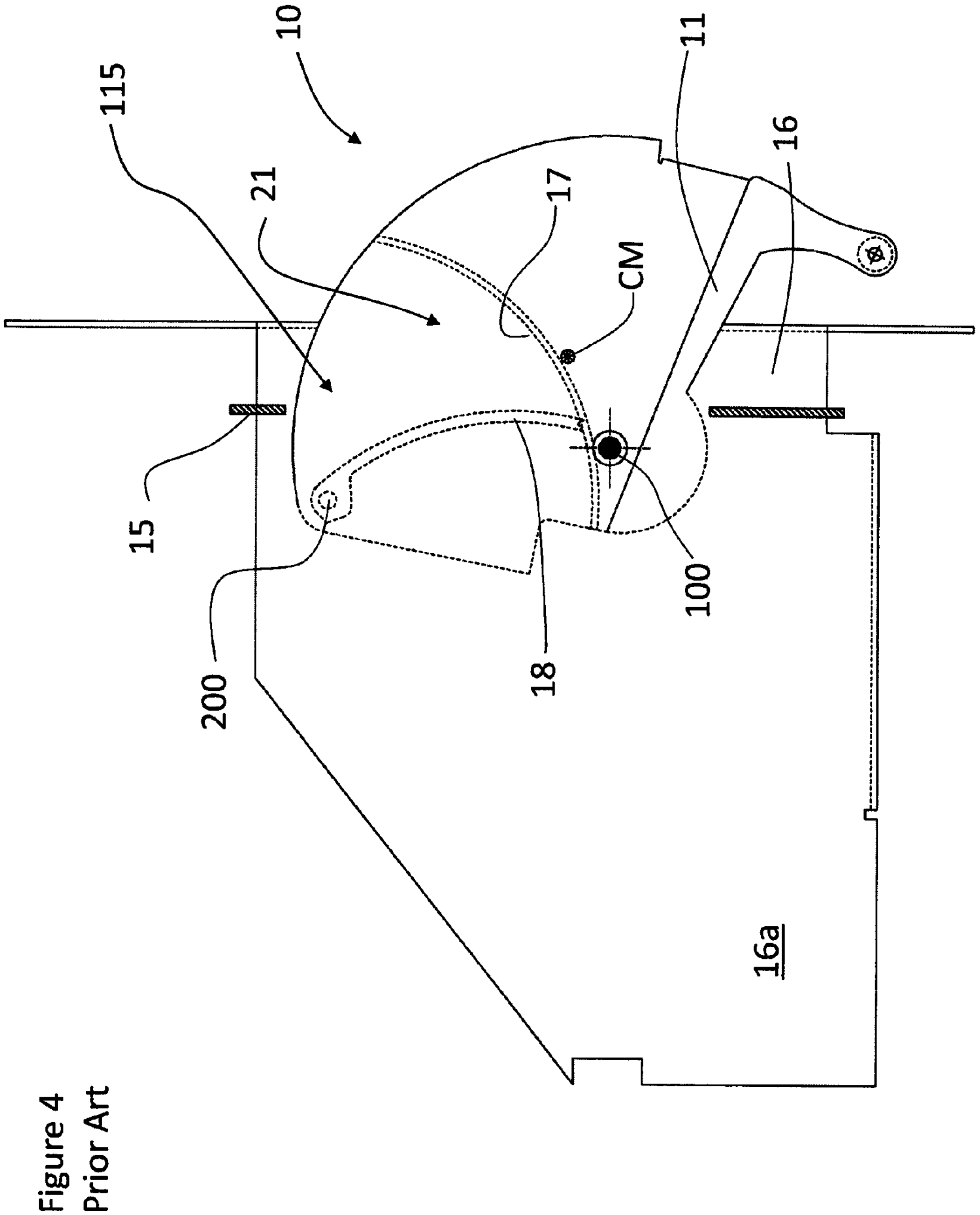
Figure 4 Prior Art
FIG. 4 shows the side elevation view of the conventional after-hour or night depository of FIG. 3, with the hopper assembly in a full-open position.

A conventional night depository device is illustrated in FIGS. 1-4 and described hereinafter. FIG. 1 shows the face or front view of the night depository device 1 installed onto the outer wall of a financial institution. FIGS. 2 and 3 show a rear view and side view, respectively, of the night depository device 1 from inside the outer wall. Illustrated is a support structure that includes a front wall frame 15 having a deposit opening 115, a side frame 16 including sidewalls **16*a*** and 16*b*, and a hopper assembly 10. The hopper assembly 10 includes a door 11, a handle 12 attached to the top outside of the door 11, a lock 13, a hopper floor 17, a plunger 18, and pivot pins 19*a*,19*b* in the sidewalls 16*a*,16*b*. The hopper assembly 10 has sidewalls 8 having a socket 9 that retains the pivot pins 19*a*,19*b* to allow the hopper assembly 10 to pivot and rotate around a horizontal pivot axis 100. The hopper assembly 10 with door 11 is shown in FIG. 3 in a closed position. FIG. 4 shows the same side view as FIG. 3 but with the hopper assembly 10 and door 11 pivoted open to a full-open or bag-stop position, which uncovers the opening 115 through the front wall frame 15 for making bag deposits. As the hopper assembly 10 and door 11 move to the full-open position, the plunger 18 pivots on axis 200 to swing downwardly and rearwardly to the back of the hopper assembly 10 to form a pocket 21 with the hopper floor 17.

The operation of a conventional hopper assembly 10 is shown in FIGS. 5-8. The operation of a conventional manually-cycled hopper-style night depository requires an amount of force to initiate an opening and a closing of the hopper mechanism. Typically the night depository can be set to function in two modes of operation. One operation allows the unit to function as an envelope depository, at an envelope-stop position. When set for this function, the hopper rotates to the envelope stop, allowing the plunger to fall and the physical opening of the hopper is restricted to only allow the user to insert a thin deposit, such as an envelope. Through the use of a key supplied by the owner of the depository, the user can insert the key and operate the key into a lock to disengage the envelope stop, and allow the hopper to open completely to the bag stop, thereby exposing a larger depository receptacle opening. This allows the user to deposit a larger package (typically referred to as a night depository bag) into secure container within the financial institution for safekeeping until it can be processed, typically the next business day. Closing the door completes the cycle and causes the plunger to eject the bag into the secure container.

Figure 5:
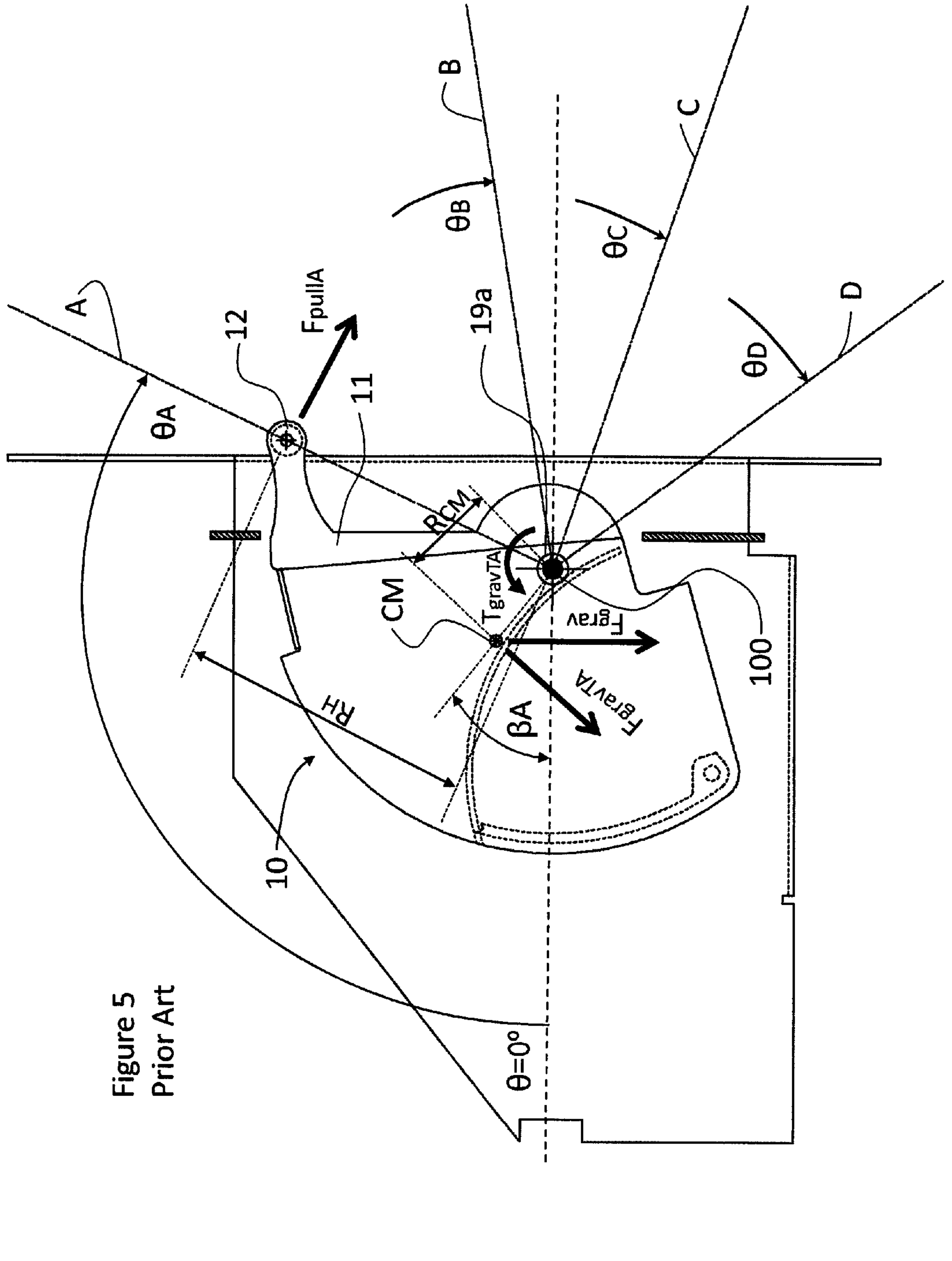
Figure 5 Prior Art
FIG. 5 shows the side elevation view of the conventional after-hour or night depository of FIG. 3, illustrating the forces for initiating an opening of the hopper assembly.

The conventional hopper assembly 10 is asymmetrical in mass, and has a horizontal pivoting axis 100 along the bottom, displaced from the true gravitational center of mass, which is illustrated for purposes of description as point CM. FIG. 5 shows a horizontal plane passing through horizontal pivot axis 100 designating a radial angle of 0°. A radial angle from the horizontal pivot axis 100 progressing from 0 degrees toward 180 degrees provides for hopper assembly rotation that is forward and downward, and in a clockwise direction as viewed from the right-side view of FIG. 5. The hopper assembly 10 typically rotates from its closed position to a full open position through an angular rotation of 90 degrees and 140 degrees, more typically between 110 and 120 degrees.

FIG. 5 also shows a reference line, labeled pivot position A, passing radially from horizontal pivot axis 100 and through the handle 12 with the door 11 in the fully closed position. This reference line pivot position A has a radial angle θA. In the illustrated embodiment, radial angle θA is about 117°.

In the fully closed position shown in FIG. 5, the gravitation center of mass CM of the hopper assembly 10 is slightly above and to the rear of the horizontal axis 100. Without being bound by any particular theory, gravity exerts a downward force ($F_{grav}$) upon the hopper assembly 10 centered at point CM. In the closed position shown in FIG. 5, the downward force of gravity exerts torque ($T_{gravTA}$) in the counterclockwise (rearwardly directed) direction around horizontal pivot axis 100.

Figure 6:
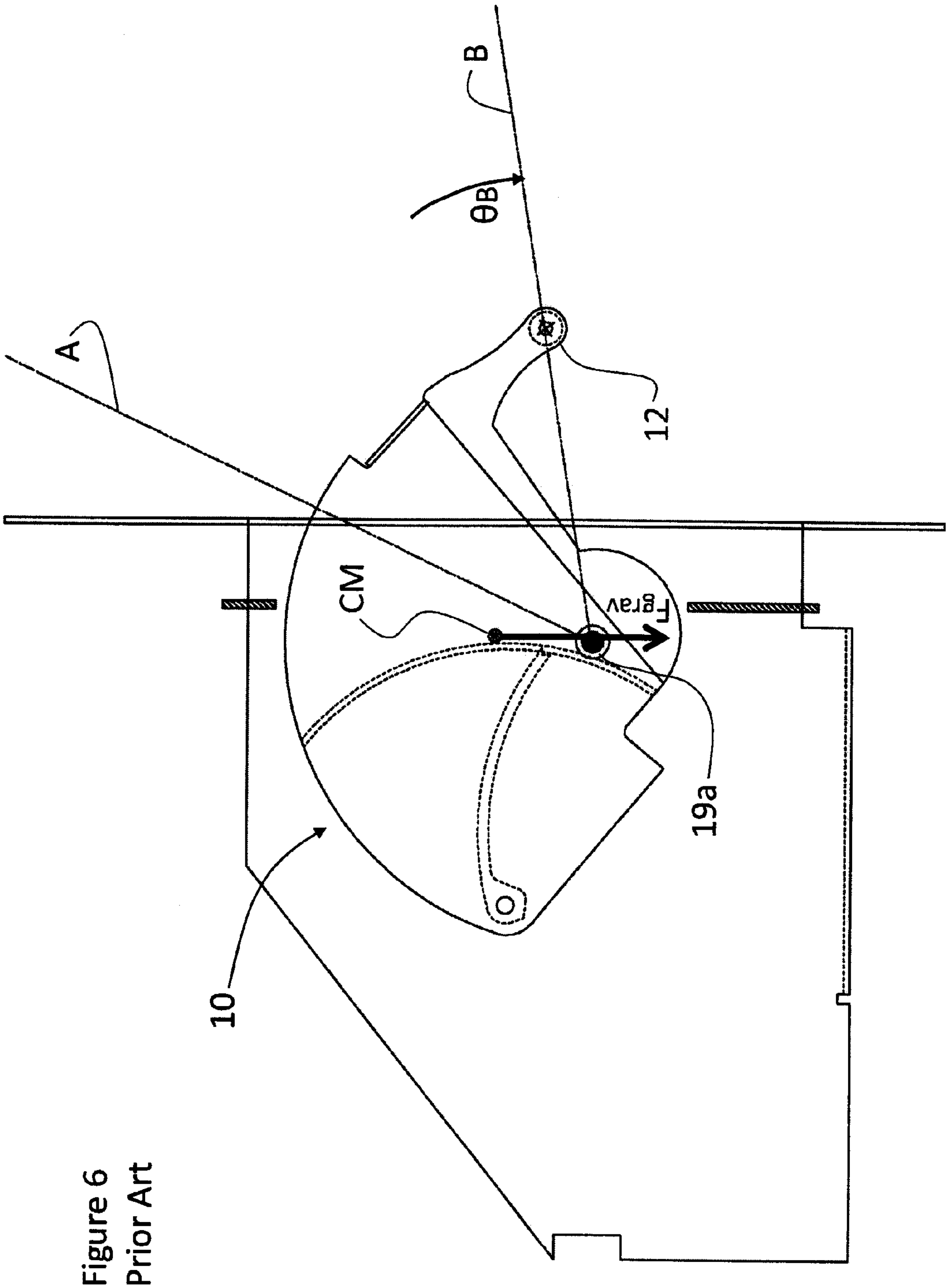
Figure 6 Prior Art
FIG. 6 shows the side elevation view of the conventional after-hour or night depository of FIG. 5, illustrating the hopper assembly during movement at a balance position.

Also shown in FIG. 5 are three additional references lines, each passing through horizontal pivot axis 100 and angularly displaced from pivot position A. The first of these additional reference lines is designated balance position B. FIG. 6 shows the hopper assembly 10 opened to pivot position B where the hopper assembly 10 is essentially in balance upon the pivot pins 19*a*,19*b*. At this point, no outside effort from the user is required to continue opening the hopper assembly 10, and the hopper assembly 10 does not free fall open. At pivot position B, it is believed that the gravitational center of mass CM of the hopper assembly 10 is positioned vertically above the horizontal axis 100, such that the hopper assembly does not exert any torque to the hopper assembly 10 around the horizontal pivot axis 100. In the illustrated embodiment, radial angle θB is about 173°.

Figure 7:
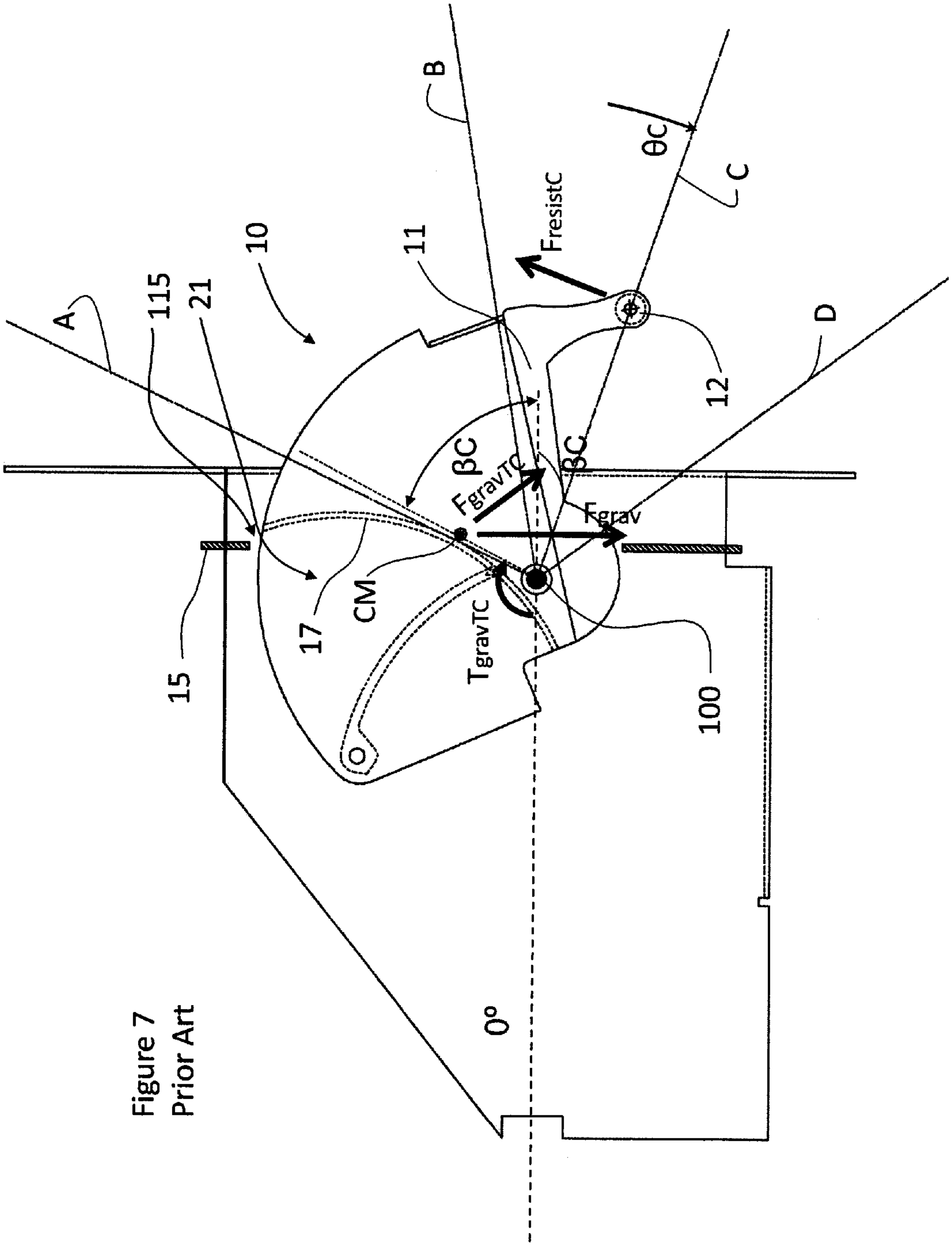
Figure 7 Prior Art
FIG. 7 shows the side elevation view of the conventional after-hour or night depository of FIG. 5, illustrating the forces for continued movement of the hopper assembly at an envelope stop position.

The second additional reference line is designated pivot position C. As shown in FIG. 7, pivot position C is the position of the handle 12 with the door 11 opened to a first stop position, which is the envelope stop. The hopper assembly 10 has passed through the balance position B in arriving at pivot position C. At this position, a thin envelope can be deposited through the opening 115 into the hopper pocket 21. At pivot position C, the downward force of gravity exerts torque ($T_{gravTC}$) in the clockwise (forward) direction around horizontal pivot axis 100. In the illustrated embodiment, radial angle θC is about 199°.

Figure 8:
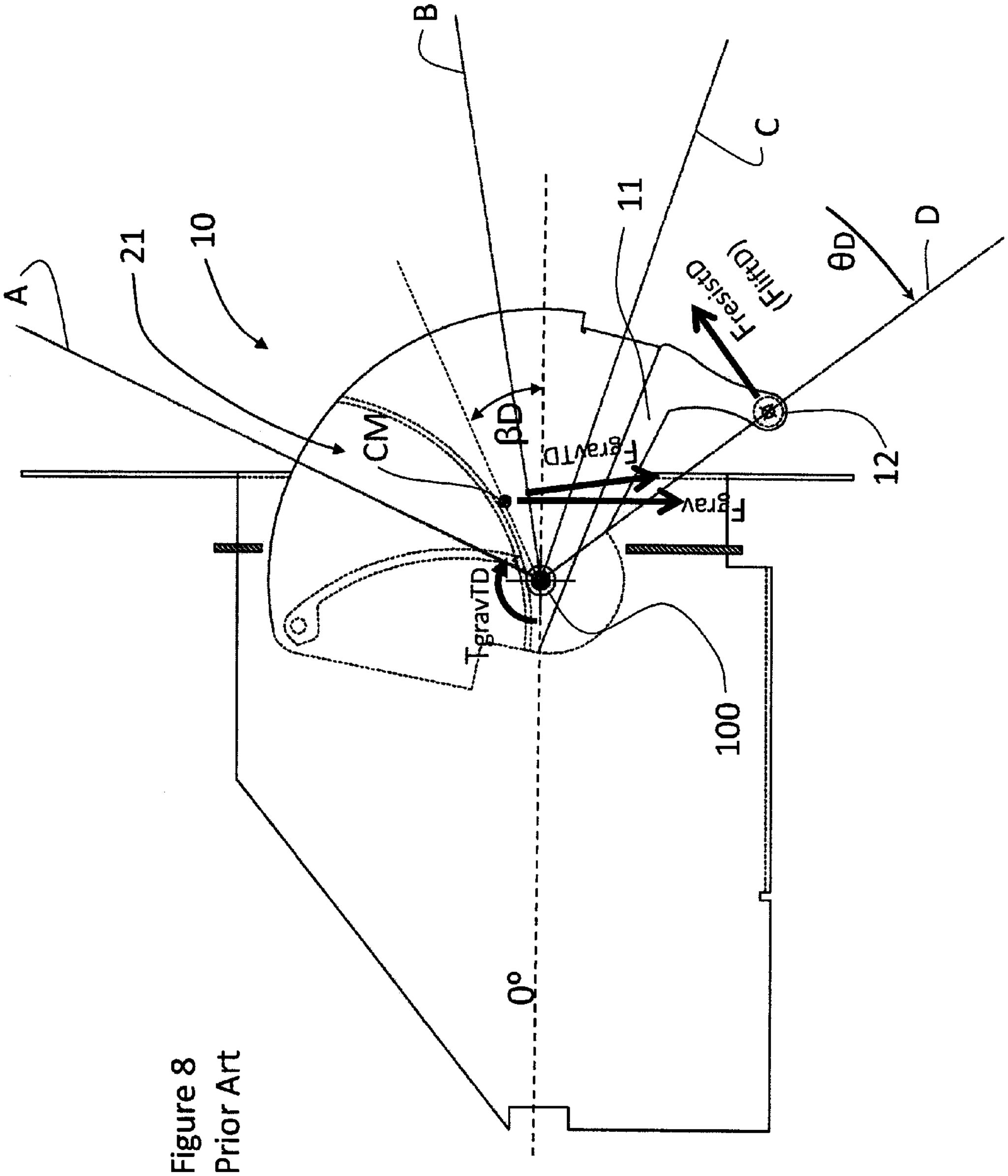
Figure 8 Prior Art
FIG. 8 shows the side elevation view of the conventional after-hour or night depository of FIG. 5, illustrating the forces for initiating a closing of the hopper assembly at a fully-opened or bag stop position.

The third additional reference line is designated pivot position D. As shown in FIG. 8, pivot position D is the position when the handle 12 with the door 11 is opening to a second stop position, also designated the full-open or bag-open stop. The hopper assembly 10 has passed through the balance position B and pivot position C. When a user employs a key to unlock stop lock 13, the door 12 can be pivoted open to pivot position D in one movement, without stopping at pivot position C (the envelope stop), in order to deposit money bags and thicker envelopes into the hopper pocket 21. At pivot position D, the downward force of gravity exerts torque ($T_{gravTD}$) in the clockwise (forward) direction around horizontal pivot axis 100. In the illustrated embodiment, radial angle θD is about 233°.

Consequently, as the door 11 is pulled by hand to initiate a deposit operation from the closed position A, the center of mass (CM) of the hopper assembly 10 rotates forward to the balance position (pivot position B), and further forward to the first stop (pivot position C) and second stop (pivot position D). The angular position of the center of mass point CM from horizontal, taken trough the horizontal pivot axis 100, is designated P. The location and angular position of the center of mass CM, the dimensions of the hopper assembly including the distance of the handle from the horizontal pivot axis, and the pivot angle of the handle, are factors in determining the amount of pull force required from the user to initiate the movement of the hopper assembly from the fully closed position (pivot position A) toward the open positions, and at positions along the pivot path to the fully open position (pivot position D), and the amount of lift force required from the user to initiate the closing of the hopper assembly from the fully open position or the envelope stop position back toward the fully closed position.

Referring again to FIG. 5, the amount of torque ($T_{gravTA}$) caused by the force of gravity ($F_{grav}$) upon the hopper assembly 10 around the horizontal pivot axis 100 is the product of the tangential force $F_{gravTA}$ on the center of mass point CM, and radial distance $R_{CM}$ from the horizontal pivot axis 100 to point CM. Tangentially-applied pull force $F_{pullA}$ upon the handle 12 exerts an oppositely directed torque (not shown) upon the hopper assembly 10 around the horizontal pivot axis 100, which is the product of $F_{pullA}$ and radial distance $R_H$ from the horizontal pivot axis 100 to the handle 12. The amount of tangentially-applied pull force $F_{pullA}$ upon the handle 12 required to move the hopper assembly 10 from the closed position, must be sufficient to overcome the torque ($T_{gravTA}$) caused by gravity. The greater radial distance of the handle 12 from the horizontal pivot axis 100, compared to that of the center-of-mass point CM, lends mechanical advantage. The pull force $F_{pullA}$ to move the hopper assembly 10 at pivot position A is:

$$F_{pullA} > F_{gravTA} \times (R_{CM}/R_H) \quad (1)$$

where $$F_{gravTA} = F_{grav} \times \cos(\beta A) \quad (2).$$

Referring to FIG. 6, at pivot position B, the pull force needed to continue moving the hopper assembly has dropped to about zero, as the point CM has pivoted toward a position vertical to the horizontal pivot axis 100 (βB=90°), such that $F_{gravTA}=0$.

Referring to FIG. 7, as the hopper assembly 10 passes further to pivot position C, the center-of-gravity point CM is pivoting forward from a vertical plane through the horizontal pivot axis 100, and gravity again exerts a torsional force ($F_{gravTC}$) on the center of mass CM of the hopper assembly, producing torque ($T_{gravTC}$) that causing the hopper assembly to begin "falling open" until it arrives at the envelope stop at pivot position C, or the bag stop at pivot position D (shown in FIG. 8). To control movement of the hopper assembly 10, the user must exert a tangentially resistive force ($F_{resistC}$) or "lift" on the door handle 12, to keep the hopper assembly 10 from free-falling by gravity. The resistive force $F_{resistC}$ at pivot position C to counter the torque ($T_{gravTC}$) caused by gravity, and support the hopper assembly 10 from falling open, is calculated as:

$$F_{resistC} = F_{gravTC} \times (R_{CM}/R_H) = F_{grav} \times \cos(\beta C) \times (R_{CM}/R_H) \quad (3).$$

Referring to FIG. 8, as the hopper assembly 10 is opened further to pivot position D, the point CM moves closer to the 0° horizontal plane through horizontal axis 100. Consequently, the torque ($T_{gravTD}$) caused by gravity on the center of mass of the hopper assembly 10 at pivot position D increases further from that at pivot position C (envelope stop) as angle β decreases. At or approaching pivot position D (bag stop), the resistive force $F_{resistD}$ to counter the torque ($T_{gravTD}$) caused by gravity, and support the hopper assembly 10 from falling open is:

$$F_{resistD} = F_{gravTD} \times (R_{CM}/R_H) = F_{grav} \times \cos(\beta D) \times (R_{CM}/R_H) \quad (4).$$

From the fully open position D, after the money bag has been placed into the pocket 21 by the user, a closing of the hopper assembly 10 is initiated. To move the hopper assembly 10 from the fully open position D (the bag stop) toward closed, the user must exert a lifting force (shown in FIG. 8 as $F_{liftD}$) upon the handle 12 to overcome (exceed) the torque caused by gravity on the hopper assembly, calculated as:

$$F_{liftD} > F_{gravTD} \times (R_{CM}/R_H) > F_{grav} \times \cos(\beta D) \times (R_{CM}/R_H) \quad (5).$$

As lifting continues, the lift force on the handle decreases as the pivot position of the hopper assembly rotates to the balance position B since cos(β) is decreasing. At balance position B again, where angle β approaches 90°, the lift force is negligible. Once the hopper assembly 10 passes the balance point, gravity begins to exert torque upon the mass in the counterclockwise direction, such that the door 12 begins to "fall" towards the closed position A. In this case, the user must exert a resistive "pulling" force (substantially as shown in FIG. 5 as the pull force $F_{pullA}$) upon the handle 12 to counter the torque caused by gravity, and support the hopper assembly 10 from falling "closed".

While movement of the hopper assembly in turn operates and moves the plunger 18 that makes up the bottom the pocket 21 (see FIGS. 3 and 4), the movement in the plunger position is not expected to contribute significantly to the center-of-mass position CM.

A force gauge can be used to quickly and easily measure the actual tangential pull force on the handle 12 at pivot position A ($F_{pullA}$) to overcome the torsional force of gravity on the hopper assembly mass and initiate opening. A typical actual tangential pull force at pivot position A of a conventional night depository hopper assembly is up to about 20 lbf, or more.

While some small decrease in the amount of pull or lift force can be obtained by the use of bearings and counterweight alone, the conventional night depository hopper assembly still requires typically about 20 pounds to open and close the hopper.

The present invention provides a mechanical device to assist the user in overcoming and resisting the torque caused by gravity on the hopper assembly during opening and closing. The mechanical device provides assistance by exerting a torsional force upon an arm affixed to the horizontal shaft of the hopper assembly, thereby delivering assisting torque, which counters the torque caused by gravity upon the hopper assembly. The assisting torque delivered by the mechanical device reduces the amount of pulling force, that a person must exert upon the handle to initiate the movement of the hopper assembly from the fully closed position (pivot position A) toward the open positions, or the amount of lifting force to move the hopper assembly along the pivot path to the envelope stop position (pivot position C) and to the fully open position (pivot position D), and the amount of lifting force to initiate the closing of the hopper assembly from either the envelope stop position (pivot position C) or the fully open position (pivot position D), back toward the fully closed position (pivot position A).

Figure 9:
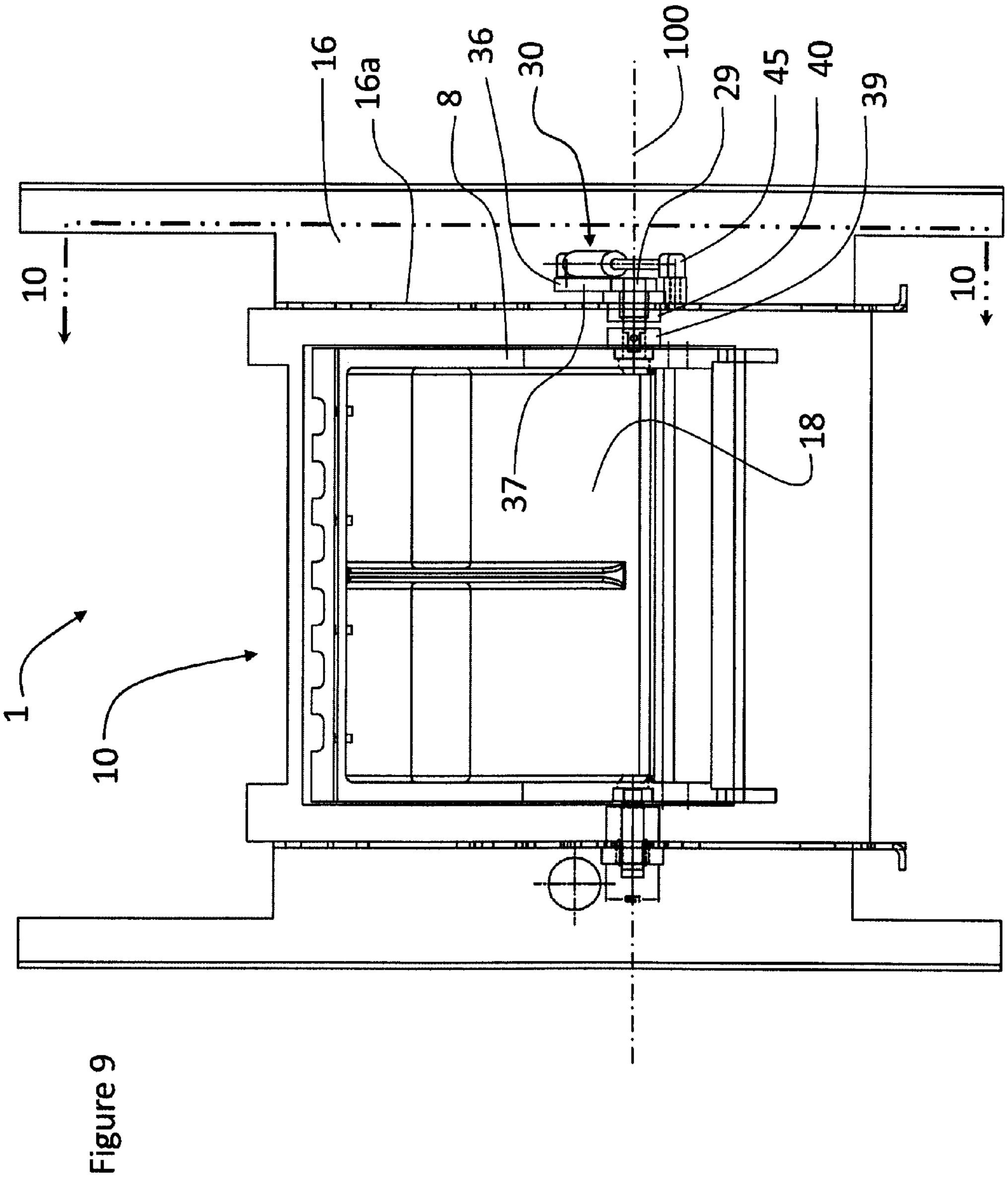
FIG. 9 shows a rear elevation view of an after-hour or night depository of present invention including a gas spring device.
Figure 10:
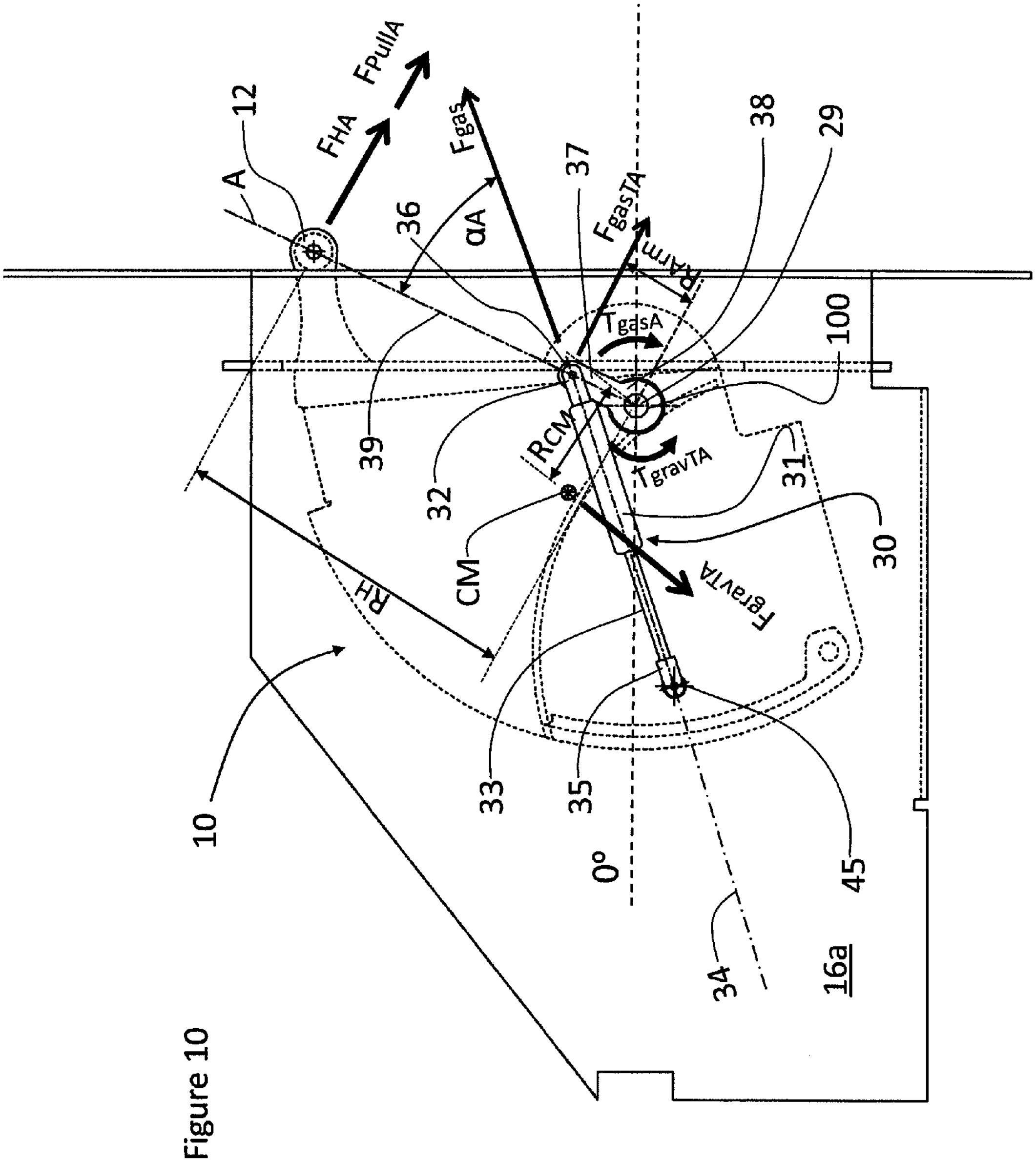
FIG. 10 shows the side elevation view of the after-hour or night depository of present invention including the gas spring, illustrating the assisting force for initiating an opening of the hopper assembly from the closed position.

FIGS. 9 and 10 illustrate rear elevation and right side elevation views of an embodiment of the invention where the mechanical device is a gas spring 30. The hopper assembly 10 is provided with a horizontal shaft 29 fixed to at least one side 8 of the hopper assembly 10 by well known means. In the illustrated embodiment, the horizontal shaft 29 is pinned to a collar 39 that is secured (for example, welded) to the sidewall 8 of the hopper assembly 10. The horizontal shaft 29 extends axially through the support sidewall 16*a*, and is typically supported for rotation through the sidewall 16*a* with a bearing or bushing 40. The base end 38 of a lever arm 37 has a bore for positioning the lever arm onto the end of the horizontal shaft 29, where it can be rotationally fixed using well known methods, such as a key and a key seat or a tap hole and pin. A gas spring 30 is pivotably secured between the lever arm 37 and an anchor position on the sidewall 16*a*, illustrated as a stationary pin 45. The distal end 36 of the arm 37 includes a bushing or bearing that accepts the first end 32 of the gas spring 30. Utilizing the stored pressure, the gas spring 30 exerts assisting torsional force on the hopper assembly 10 through the lever arm 37 fixed to the extending end of the horizontal shaft 29, which delivers torque on the horizontal shaft 29 to assist a depositing user in opening and closing the hopper assembly.

The push-type gas spring 30 includes a pressurized cylinder housing 31, a first securement end 32, and an extending piston rod 33 moveable along the longitudinal axis 34 and having a second securement end 35. The push-type gas cylinder 30 exerts force $F_{gas}$ outwardly at the first end 32 and second end 35. The first end 32 is pivotably secured to the distal end 36 of the arm 37. The second securement end 35 is pivotably secured to a stationary pin 45 that is attached to the sidewall 16*a*, which anchors the second end 35. Typical force requirements of the gas spring range from 100N (22.5 lbf) to 1000N (225 lbf). Push-type gas cylinder are available from STABILUS GmbH, Koblenz, Germany, model LIFT-O-MAT, which are available in various sizes. Model LIFT-O-MAT 500N (112.5 lbf) works satisfactorily.

In the illustrated embodiment, a longitudinal axis 39 of the lever arm 37 extends through the centerline of the handle 12, so that the angular position of the lever arm 37 is the same as the radial angle θ of the handle 12. It should be understood that the angular position of the lever arm 37 can also be off-set from the angle θ of the handle 12, and provided that the angular orientation of the arm 37, gas spring 30 and stationary pin 45 are fixed, this group of features can be pivoted about the shaft 29 at any convenient angular position to provide the functions described herein in the illustrated embodiment.

Preferably, as shown in FIG. 9, the mechanical device is secured to the outside of the sidewall 16*a* (or alternatively, to the left sidewall 16*b*) of the night depository device 1. The space available within the sidewalls 16*a*, 16*b* of conventional depository devices is limited, and a malfunction of any mechanical device inserted in the operating space of the hopper assembly (between the sidewalls 16*a*,16*b*) could jam the device and disable operation of the depository device completely. Even routine maintenance of the mechanical device would reasonably require extensive disassembly of the depository device.

At the fully closed position as shown in FIG. 10, the gas spring 30 exerts a substantially constant linear force $F_{gas}$ outward along the axis 34, which is exerted upon the end 36 of the lever arm 37, and the stationary pin 45. The resulting tangential force torsional force ($F_{gasTA}$) on the arm 37 produces torque $T_{gasA}$ upon the horizontal pivot shaft 29 of the hopper assembly 10 in the clockwise direction around axis 100, which counters a significant portion of the torque $T_{gravTA}$ resulting from the torsional force of gravity ($F_{gravTA}$) operating upon the center of mass CM of the hopper assembly 10 in the counterclockwise direction. The torsional force $F_{gasTA}$ on the arm 37 produces a force $F_{HA}$ at handle 12 that reduces the amount of pull force $F_{pullA}$ that the person needs to exert on the handle 12 to initiate the movement of the hopper assembly 10 from the fully closed position (pivot position A) toward the opened positions.

The assisting tangential force $F_{HA}$ at the handle 12 is determined according to the equation:

$$F_{HA}=F_{gasTA}\times(R_{Arm}/R_H) \quad (6),$$

where $$F_{gasTA}=F_{gas}\times\sin(\alpha A) \quad (7),$$

where αA is the angle formed between the axis 34 of the gas spring 30 and the radial axis 39 of lever arm 37.

The amount of pull force $F_{pullA}$ that the person needs to exert on the handle 12 to initiate the movement of the hopper assembly 10 from the fully closed position can be represented as:

$$FpullA > \frac{FgravTA\times R_{CM} - FgasTA\times RArm}{R_H}. \quad (8)$$

In the illustrated embodiment, the amount of pull force $F_{pullA}$ is less than 5 lbf.

Figure 11:
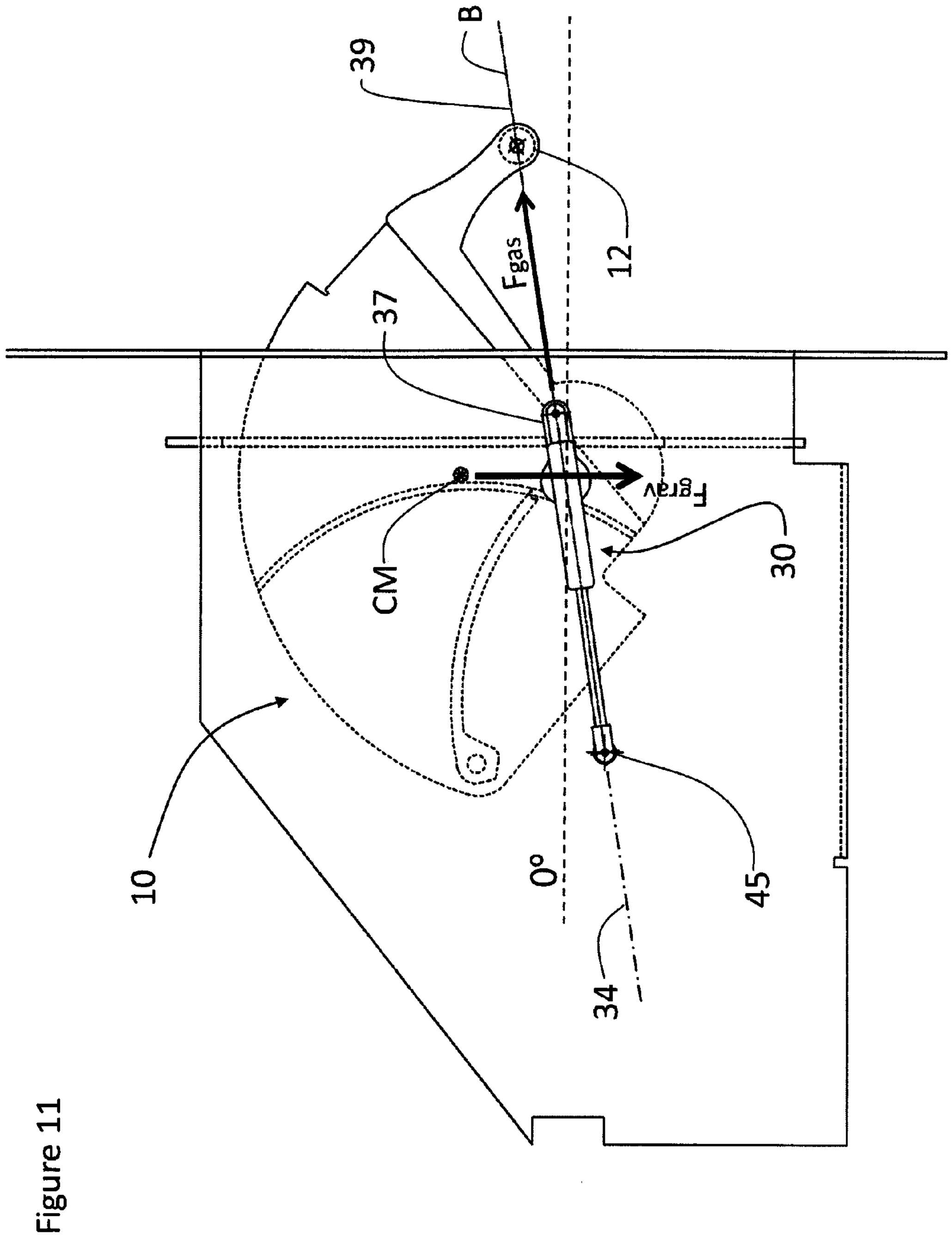
FIG. 11 shows the side elevation view of the conventional after-hour or night depository of FIG. 9, illustrating the hopper assembly at the balance position.

After initiating opening, the hopper assembly 12 is rotated toward the open positions. At pivot position B shown in FIG. 11, the balance point of the conventional hopper assembly, gravity does not exert any torque on the hopper assembly 10. In the illustrated embodiment, αB is essentially zero, since the axis 34 of the gas spring 30 coincides with the radial axis 39 of lever arm 37.

Figure 12:
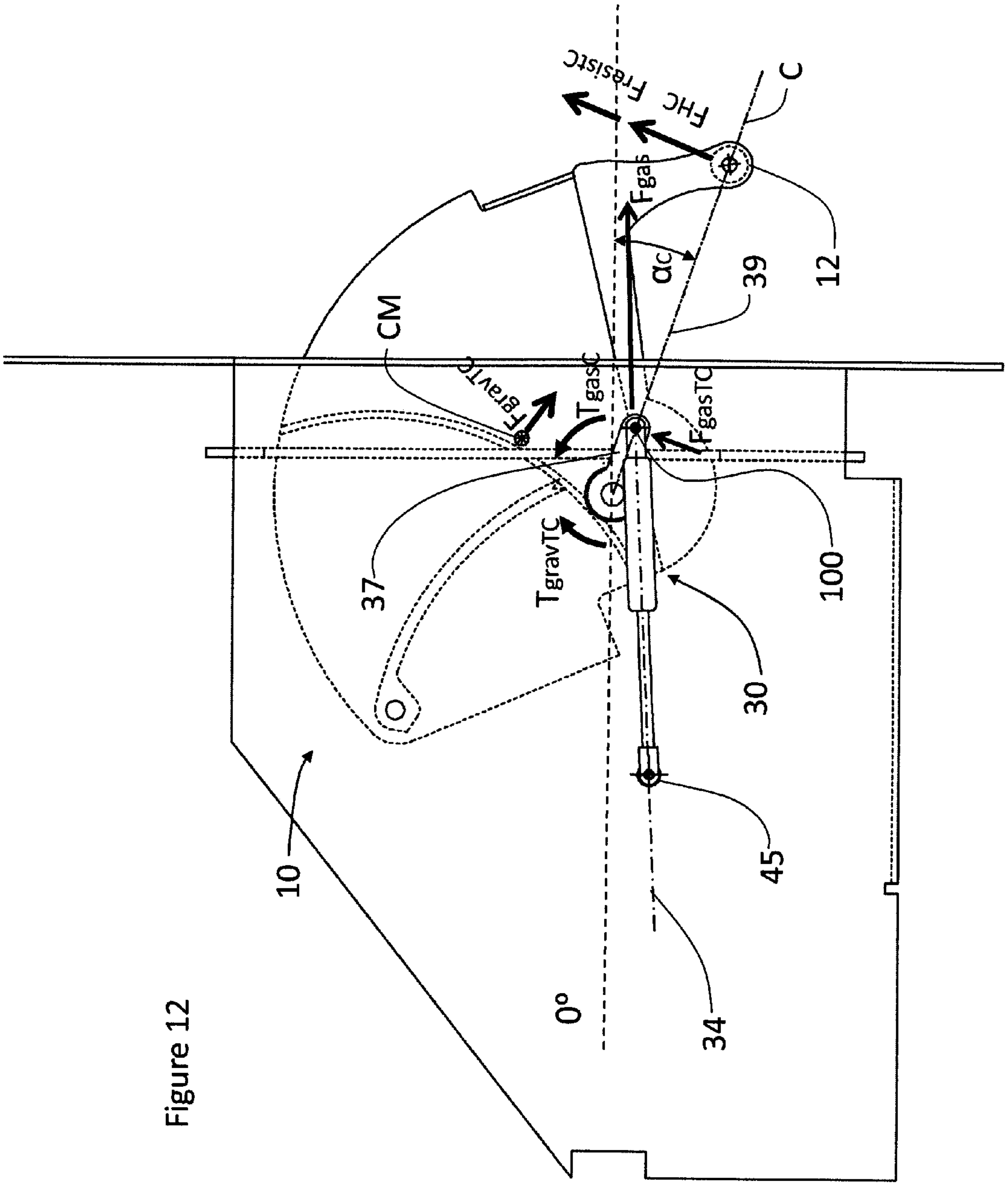
FIG. 12 shows the side elevation view of the after-hour or night depository of present invention including the gas spring, illustrating the assisting force for continued movement of the hopper assembly at the envelope stop position.

As shown in FIG. 12, as the hopper assembly 10 is rotated further toward the open positions, gravity begins again to exert torque in the clockwise (forward) direction as the center of mass CM moves forward of the horizontal pivot line 100. Just before arriving at the envelope stop position C, the clockwise gravitational torque $T_{gravTC}$ resulting from the tangential force of $F_{gravTC}$ on the center of mass CM of the hopper assembly 10, is being opposed by the assistive torque $T_{gasC}$ in the counterclockwise direction resulting from tangential force $F_{gasTC}$ exerted on the end of the arm 37, which produces the assisting tangential force $F_{HC}$ at the handle 12, and significantly reduces the amount of resistive or lift force ($F_{resistC}$) that the user needs to exert to support the hopper assembly 10 from falling open. The amount of pull force $F_{resistC}$ can be determined according to the principles of Equation 8.

Figure 13:
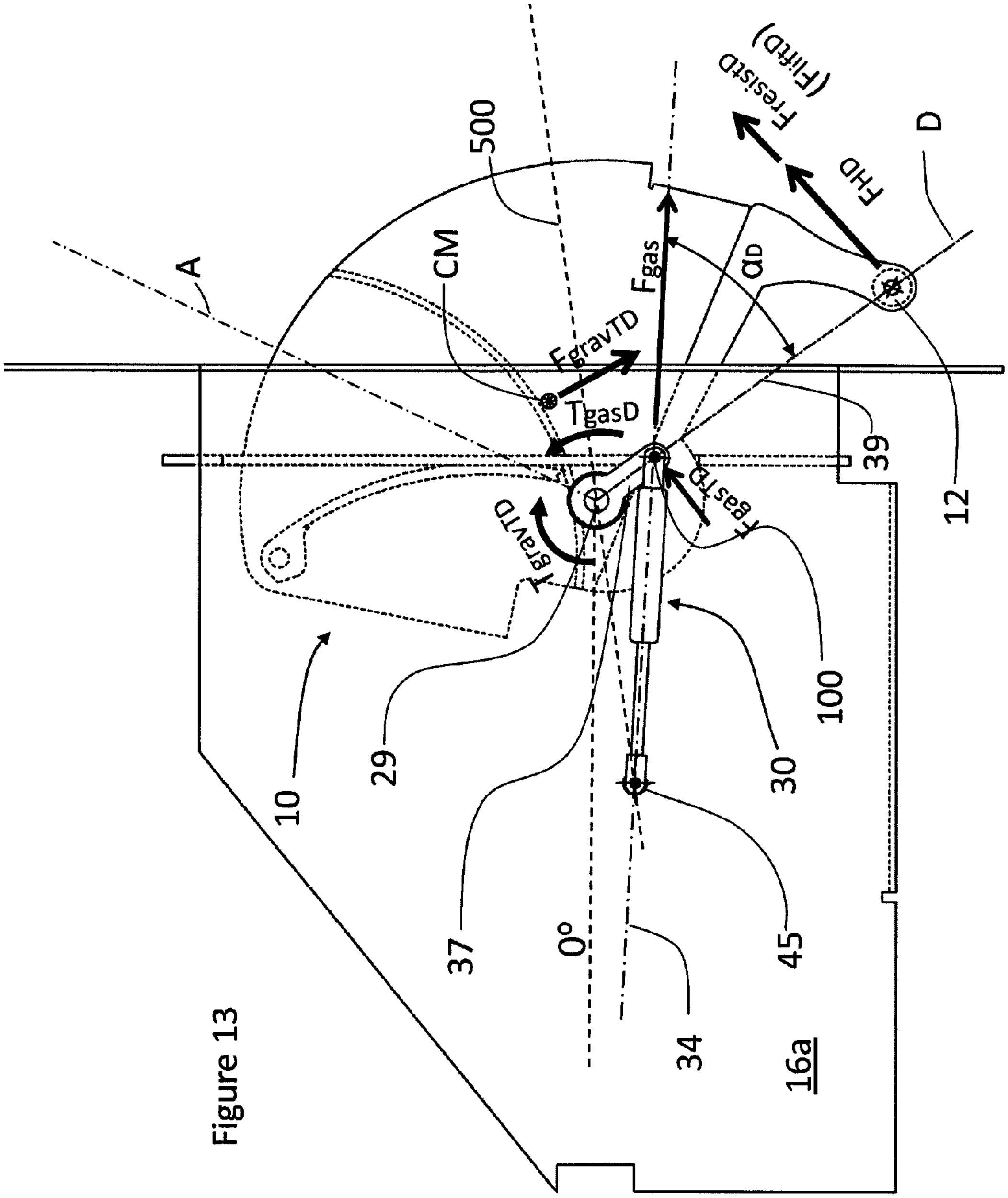
FIG. 13 shows the side elevation view of the after-hour or night depository of present invention including the gas spring, illustrating the assisting force for initiating a closing of the hopper assembly at the fully-opened or bag stop position

As shown in FIG. 13, as the hopper assembly 10 continues to be rotated toward the full open position, gravity exert torque in the clockwise (forward) direction as the center of mass CM moves forward of the horizontal pivot line 100. Just before arriving at the bag stop position D, the clockwise gravitational torque $T_{gravTD}$ resulting from the tangential force of $F_{gravTD}$ on the center of mass CM of the hopper assembly 10, is opposed by the assistive torque $T_{gasD}$ in the counterclockwise direction resulting from tangential force $F_{gasTD}$ exerted by the gas spring 30 on the end of the arm 37, which produces an equivalent assisting tangential force $F_{HD}$ at the handle 12, and significantly reduces the amount of resistive or lift force ($F_{resistD}$) that the user needs to exert to support the hopper assembly 10 from falling open to the bag stop. The amount of pull force $F_{resistD}$ can be determined according to the principles of Equation 8.

From the fully open position D, after the money bag has been placed into the pocket 21 by the user, a closing of the hopper assembly 10 is initiated. To move the hopper assembly 10 from the fully open position D (the bag stop) toward closed, the user now exerts a lifting force (also shown in FIG. 13 as $F_{liftD}$) upon the handle 12, with the assistance of tangential force $F_{HC}$ at the handle 12 produced by the gas spring 30 acting on the arm 37 as described above.

As lifting continues, the lift force on the handle 12 continues to be assisted by the tangential force $F_{HC}$ at the handle 12 produced by the gas spring 30 acting on the arm 37. In accordance with the principles described above, the gravitational torque $T_{gravT}$ exerted on the hopper assembly device 10 by gravity decreases as the hopper assembly 10 is rotated back to the balance position B, and then increases as the hopper assembly 10 continues toward the closed position A. At the same time, the oppositely-directed assistive torque $T_{gas}$ resulting from the force of the gas spring 30 exerted on the end of the arm 37 decreases as the hopper assembly 10 is rotated back to the balance position B, and then increases as the hopper assembly 10 continues toward the closed position A.

The air spring force $F_{gas}$ is positioned to exert clockwise-directional tangential force $F_{gasTA}$ at pivot position A, and counterclockwise-directional tangential force $F_{gasTD}$ at pivot position D. In typical hopper assembly designs, where the balance position is substantially in the middle of pivot position A (fully closed) and pivot position D (fully opened), the tangential force $F_{gasTA}$ at pivot position A is substantially the same and oppositely directed rotationally from the tangential force $F_{gasTD}$ at pivot position D. To accomplish this, the stationary pin 45 is positioned at an anchor position on the sidewall 16*a* such that a line 500 passing through the stationary pin 45 and the horizontal axis 100 of the shaft 29 divides the sweep arc of the arm 37 into two parts, where the arm sweep arc is defined by the arm's positions at pivot positions A and D. Typically the line 500 divides the arc sweep about midway. In the illustrated embodiment, the arm 37 has been secured to the horizontal shaft 29 in a position so that the arm 37 substantially extends along an axis line 39 radiating from the horizontal shaft 29 through the handle 12. In this embodiment, the lever arm 37 is aligned with the handle 12, such that the line 500 passing through the stationary pin 45 and the horizontal axis 100 of the shaft 29 also divides the sweep arc of the handle 12 between pivot position A and pivot position D.

It can be understood that the assisting tangential force at the handle 12 that is exerted by the gas spring 30 can be increased by lengthening the lever arm 37, by increasing the force capacity of the gas spring, or by increasing the angle α (formed by the axis 34 of the gas spring 30 and the radial axis 39 of lever arm 37).

The push-type gas powered spring not only assists in the movement of the hopper assembly during the initial opening and initial closing, but also adds a pull or resist force to control to the hopper assembly on the free fall portion of the hopper assembly movement. As can be understood from FIG. 10, as the hopper assembly 10 is rotated forward (clockwise) toward a position where the gas spring 30 aligns with the lever arm 37, the assist force contributed by the gas spring decreases as a function of sin(α) toward zero. Conversely, as the hopper assembly 10 continues rotating forward (clockwise) from such position, the assist force contributed by the gas spring increases as a function of sin(α). These contributions of assisting pull force and lift force result in less overall force required to be supplied by the user to the handle in order to safely and correctly operate the depository in between the initial closed and opened positions. The user operating the hopper assembly 10 will exert a significantly reduced amount of pull force or lift force between the closed and open positions. The features of the invention can be adjusted to substantially normalize the forces required to operate the device between the closed and open positions, typically to a force level below about 5 pounds.

Figure 14:
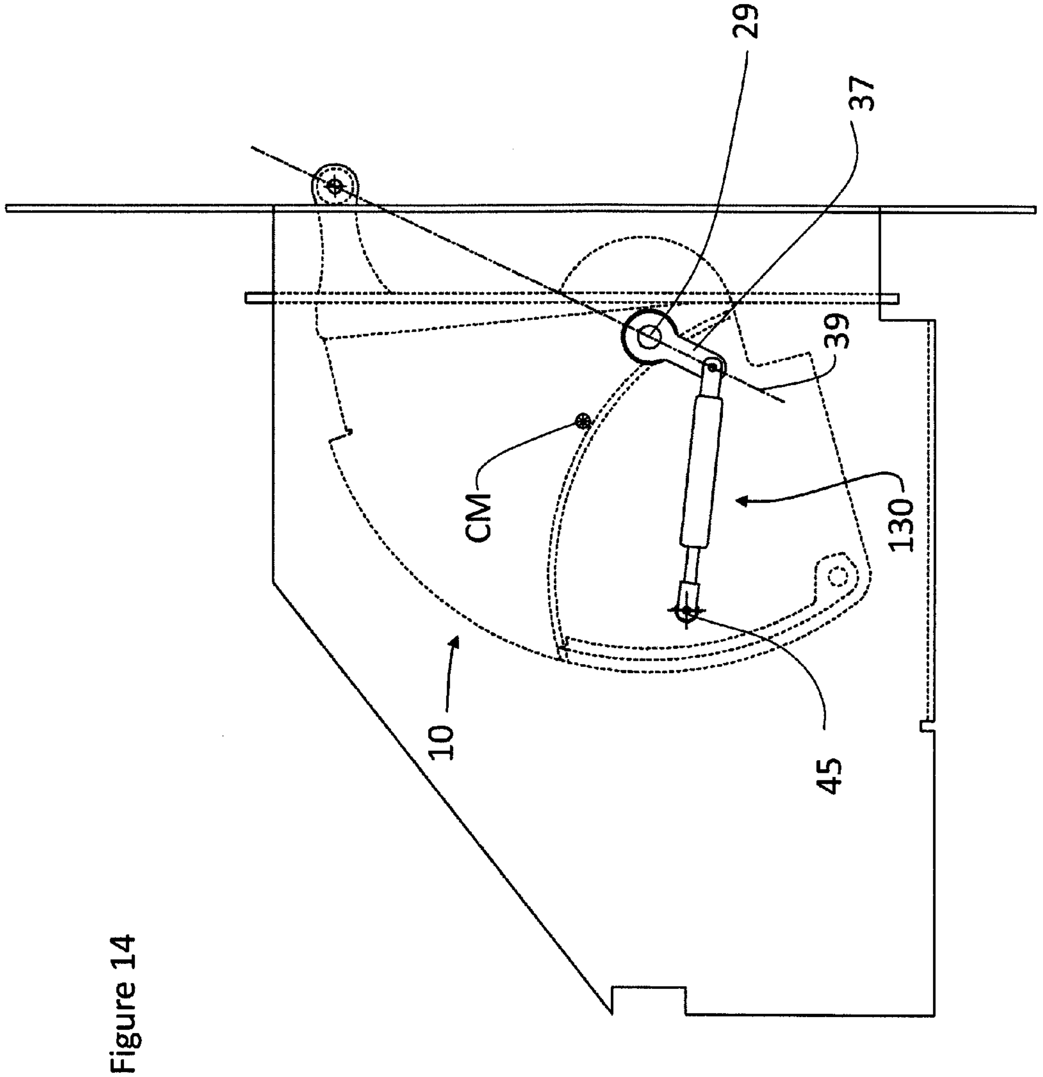
FIG. 14 shows the side elevation view of the after-hour or night depository of present invention including an alternative arrangement of the gas spring device.

The gas spring can be selected from a push-type gas spring and a pull-type gas spring. The push-type gas spring exerts an extending force outward along its axis, while a pull-type gas spring exerts a contracting force inward along its axis. Push-type gas cylinders are configured on the hopper assembly 10 with the arm end extending from 90-135° (from the 0° reference plane) at the fully closed position (which is also the arm's initial angular position), while pull-type gas cylinders are configured on the hopper assembly 10 with the arm end extending 225-270° at fully closed. If the illustrated embodiment were modified to use a pull-type gas spring 130 instead, then the respective angular positions of the arm 37 would be reversed or position 180° from those used with the push-type gas spring 30. This is illustrated in FIG. 14, where a pull-type gas spring 130.

Pull Force Studies

A conventional night depository hopper assembly in the closed position, substantially as shown in FIG. 5, was determined to have a gravitational center of mass of about 1.82" above and about 2.31" rearward from the transverse horizontal axis 100, and between the ends thereof at centerpoint 300 (see FIG. 2).

A force gauge (Mecmesin Model CFG 200N) was used to measure the actual amount of force required on the handle to open the hopper assembly, from the full closed position (pivot position A), move it through the balance position (pivot position B) and the envelope stop (pivot position C), to the fully-opened bag stop (pivot position D), and then back to closed.

The depository device was then modified in accordance with the embodiment described above, including a 500N (112.4 lbf) push-type gas spring and a horizontal shaft affixed to the hopper assembly and extended through the sidewalls with the lever arm 37 fixed to the end. The horizontal shaft rotated in a bearing fixed to the sidewalls. The depository device had a pivot axis-to-handle dimension ($R_H$) of about 10 inches, and a lever arm length ($R_{Arm}$) of about 2 inches. The lever arm was fixed to the horizontal shaft of the hopper assembly to provide an angle αA at pivot position A of +55° (clockwise tangential force), and an angle αD at pivot position D of −59° (counterclockwise tangential force).

The force gauge was again used to measure the actual amount of force required on the handle to open the hopper assembly, from the full closed position (pivot position A), move it through the balance position (pivot position B) and the envelope stop (pivot position C), to the fully-opened bag stop (pivot position D), and then back to closed (pivot position A).

The results of force measurements for the conventional depository device and for the depository device of the present invention with the push-type gas spring, are shown in Table A.

TABLE A

| Operation (pounds force) | Pull Force to Initiate Opening (Position A, $F_{pullA}$) | Pull/Resist Force at Balance Position ($F_{pullB}$) | Resist/Lift Force at Envelope Stop (Position C, ($F_{resistC}$) | Resist/Lift Force at Full Open (Position D, $F_{resistD}$) |
|---|---|---|---|---|
| Conventional - Full Open to Bag Stop | 20 | 0 | 14 | 20 |
| Invention - Full Open to Bag Stop | 4 | 0.5 | 3.5 | 4 |
| Conventional - Open to Envelope Stop | 20 | 0 | 14 | |
| Invention - Open to Envelope Stop | 4 | 0.5 | 3.5 | |

While specific embodiments of the method of the present invention have been described, it will be apparent to those skilled in the art that various modifications thereto can be made without departing from the spirit and scope of the present invention as defined in the appended claims.

We claim:

1. An after hour depository, including:

a framework including a first sidewall and a second sidewall, and having a front opening, a hopper assembly including a door having a front face and bottom portion, a handle disposed on an upper end of the front face, and a deposit hopper on the inside of the door, a horizontal shaft fixed to and extending from at least one side of the bottom portion of the hopper assembly, the horizontal shaft having an end portion extending through the first sidewall, the horizontal shaft and the hopper assembly being pivotable within the framework between a closed position in which the door covers the front opening of the framework, and a full open position in which the front opening is uncovered, a lever arm fixed to the end portion of the horizontal shaft at a rotary angle, the lever arm including a distal arm end extending radially, and a gas spring secured pivotably at a first end to the distal end of the lever arm, and secured pivotably at a second end to the first sidewall at an anchor position, wherein the gas spring exerts a torsional force on the distal end of the lever arm to deliver a torque on the horizontal shaft that reduces the pulling force on the handle required to initiate the movement of the hopper assembly from the closed position toward the full open position.

2. The after hour depository according to claim 1, wherein the gas spring is a pushing gas spring that exerts an extending force outward along an axis of the pushing gas spring.

3. The after hour depository according to claim 1, wherein the lever arm extends radially in a direction substantially through the handle.

4. The after hour depository according to claim 1, wherein at the closed position of the hopper assembly, the force rating of the gas spring, the length of the distal end of the lever arm, and the rotary angle of the lever arm deliver a torque on the horizontal shaft that exerts at least 15 lbf of tangential force at the handle.

5. The after hour depository according to claim 1, further including a stationary pin fixed to the first sidewall at the anchor position, wherein the gas spring is secured pivotably at the second end to the stationary pin.

6. The after hour depository according to claim 5, wherein the lever arm has an arcuate arm sweep defined between the closed position and the full open position of the hopper assembly, and wherein a line, which passes through the stationary pin and the horizontal shaft, divides the arcuate arm sweep.

7. The after hour depository according to claim 6, wherein the line divides the arcuate arm sweep in the middle.

8. The after hour depository according to claim 1, further including a movable plunger in operative association with the hopper assembly for developing a pocket in which a bag or an envelope including money to be deposited is placed.

9. The after hour depository according to claim 1, wherein the gas spring is a pulling gas spring that exerts a contracting force inward along an axis of the pulling gas spring.

* * * * *

UNITED STATES PATENT AND TRADEMARK OFFICE

CERTIFICATE OF CORRECTION

PATENT NO. : 8,136,718 B1
APPLICATION NO. : 13/052574
DATED : March 20, 2012
INVENTOR(S) : Michael J. Snyder et al.

It is certified that error appears in the above-identified patent and that said Letters Patent is hereby corrected as shown below:

Column 6, line 45, delete "P" and insert --β--.

Signed and Sealed this
Twenty-second Day of May, 2012

David J. Kappos
*Director of the United States Patent and Trademark Office*